(12) United States Patent
Santos (10) Patent No.: US 11,363,795 B1
(45) Date of Patent: Jun. 21, 2022

(54) HEATED PET CARRIER BAG

(71) Applicant: Manuel Santos, Fall River, MA (US)

(72) Inventor: Manuel Santos, Fall River, MA (US)

( * ) Notice: Subject to any disclaimer, the term of this patent is extended or adjusted under 35 U.S.C. 154(b) by 313 days.

(21) Appl. No.: 16/735,795

(22) Filed: Jan. 7, 2020

(51) Int. Cl.
*A01K 1/02* (2006.01)

(52) U.S. Cl.
CPC .................. *A01K 1/0254* (2013.01)

(58) Field of Classification Search
CPC .... A01K 1/0245; A01K 1/0236; A01K 1/033; A01K 1/0047; A01K 1/035; A01K 1/0254
USPC .......................................... 119/497, 496, 453
See application file for complete search history.

(56) References Cited

U.S. PATENT DOCUMENTS

| | | | |
|---|---|---|---|
| 3,861,356 A * | 1/1975 | Kulka | A01K 1/033 119/482 |
| 4,827,872 A * | 5/1989 | Sommers | A01K 1/033 119/482 |
| 5,216,977 A * | 6/1993 | Allen, Jr. | A01K 1/033 119/500 |
| 5,277,148 A * | 1/1994 | Rossignol | A01K 1/029 119/453 |
| 5,727,503 A * | 3/1998 | Whittaker | A01K 1/0236 119/500 |
| 5,887,436 A * | 3/1999 | Duddleston | A01K 1/0245 62/3.62 |
| 6,084,209 A | 7/2000 | Reusche | |
| 6,237,531 B1 | 5/2001 | Peeples | |
| 6,305,587 B1 * | 10/2001 | Miller | A45C 7/0068 224/153 |
| 6,490,995 B2 * | 12/2002 | Greene, Jr. | A01K 1/0236 119/496 |
| 6,622,652 B1 | 9/2003 | Wang | |
| 6,647,925 B1 * | 11/2003 | Waiters | A01K 1/0245 119/453 |
| 6,725,805 B1 * | 4/2004 | Bach | A01K 1/0218 119/311 |
| 6,923,144 B2 * | 8/2005 | Little | A01K 1/0218 119/448 |
| D523,995 S | 6/2006 | Knittle | |
| 2006/0037553 A1 * | 2/2006 | Miller | A01K 1/033 119/497 |
| 2006/0288949 A1 | 12/2006 | Axinte | |
| 2007/0022969 A1 | 2/2007 | Godshaw | |
| 2008/0022935 A1 | 1/2008 | Fine | |

(Continued)

FOREIGN PATENT DOCUMENTS

CN 108812358 A * 11/2018
CN 109213222 A * 1/2019

(Continued)

*Primary Examiner* — Yvonne R Abbott-Lewis
(74) *Attorney, Agent, or Firm* — Kyle A. Fletcher, Esq.

(57) ABSTRACT

The heated pet carrier bag is configured for use with a companion animal. The heated pet carrier bag is a luggage item. The heated pet carrier bag transports the companion animal. The heated pet carrier bag forms a temperature-controlled space used to contain the companion animal. The heated pet carrier bag comprises a carrier and a control circuit. The carrier contains the control circuit. The carrier forms the luggage used to transport the companion animal. The control circuit is an electric circuit used to warm the containment space for the companion animal.

18 Claims, 6 Drawing Sheets

(56) References Cited

U.S. PATENT DOCUMENTS

| | | | |
|---|---|---|---|
| 2009/0118869 A1* | 5/2009 | Cauchy | A01K 1/0245 700/276 |
| 2010/0089335 A1 | 4/2010 | DelaBarre | |
| 2010/0319627 A1* | 12/2010 | Cauchy | F24F 5/0042 119/500 |
| 2012/0186533 A1 | 7/2012 | Lu | |

FOREIGN PATENT DOCUMENTS

| | | | | |
|---|---|---|---|---|
| CN | 111226807 A | * | 6/2020 | |
| KR | 20180000785 U | * | 3/2018 | |
| WO | WO-0179069 A1 | * | 10/2001 | A45C 13/00 |

* cited by examiner

HEATED PET CARRIER BAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry and the care of animals, more specifically, a transport bag for an animal. (A01K1/0236)

SUMMARY OF INVENTION

The heated pet carrier bag is configured for use with a companion animal. The heated pet carrier bag is a luggage item. The heated pet carrier bag transports the companion animal. The heated pet carrier bag forms a temperature-controlled space used to contain the companion animal. The heated pet carrier bag comprises a carrier and a control circuit. The carrier contains the control circuit. The carrier forms the luggage used to transport the companion animal. The control circuit is an electric circuit used to warm the containment space for the companion animal.

These together with additional objects, features and advantages of the heated pet carrier bag will be readily apparent to those of ordinary skill in the art upon reading the following detailed description of the presently preferred, but nonetheless illustrative, embodiments when taken in conjunction with the accompanying drawings.

In this respect, before explaining the current embodiments of the heated pet carrier bag in detail, it is to be understood that the heated pet carrier bag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heated pet carrier bag.

It is therefore important that the claims be regarded as including such equivalent construction insofar as they do not depart from the spirit and scope of the heated pet carrier bag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The heated pet carrier bag 100 (hereinafter invention) is configured for use with a companion animal 103. The invention 100 is a luggage item. The invention 100 transports the companion animal 103. The companion animal 103 is defined elsewhere in this disclosure. The invention 100 forms a temperature controlled space used to contain the companion animal 103. The invention 100 comprises a carrier 101 and a control circuit 102. The carrier 101 contains the control circuit 102. The carrier 101 forms the luggage used to transport the companion animal 103. The control circuit 102 is an electric circuit used to warm the containment space for the companion animal 103.

The carrier 101 is a luggage item. The carrier 101 is a hand carried item. The carrier 101 forms a first containment space. The first containment space formed by the carrier 101 is sized to receive and contain the companion animal 103 for transport. The carrier 101 is a semi-rigid structure. The carrier 101 comprises a bag 111, a shoulder strap 112, a handle 113, a footing 114, and a pocket 115. The shoulder strap 112, the handle 113, the footing 114, and the pocket 115 attach to the bag 111.

The bag 111 is a container. The bag 111 is a hollow semi-rigid structure. The bag 111 forms the base of the luggage item used to transport the companion animal 103. The companion animal 103 is transported in the hollow interior of the bag 111. The bag 111 further comprises a first entry flap 131, a second entry flap 132, and a liner 133.

The first entry flap 131 is a vertically oriented flap that provides access into the first containment space formed by the carrier 101. The first entry flap 131 is formed through the exterior surface of the bag 111. The first entry flap 131 further comprises a first zipper 161. The second entry flap 132 is a horizontally oriented flap that provides access into the first containment space formed by the carrier 101. The second entry flap 132 is formed through the exterior surface of the bag 111. The second entry flap 132 further comprises a second zipper 162.

The term flap is defined elsewhere in this disclosure. The first zipper 161 is a fastening structure. The first zipper 161 secures the first entry flap 131 to the exterior surface of the bag 111 in a position that encloses the first containment space formed by the carrier 101. The second zipper 162 is a fastening structure. The second zipper 162 secures the second entry flap 132 to the exterior surface of the bag 111 in a position that encloses the first containment space formed by the carrier 101.

The liner 133 is a plastic sheeting. The liner 133 lines a portion of the first containment space formed by the carrier 101 such that the interior surfaces of the bag 111 are protected from any befoulment released by the companion animal 103. The liner 133 is defined elsewhere in this disclosure.

The shoulder strap 112 is a mechanical structure. The shoulder strap 112 attaches to the bag 111. The shoulder strap 112 is used to suspend the carrier 101 from an object. The shoulder strap 112 further comprises a plurality of anchor points 141. Each of the plurality of anchor points 141 is a ring that attaches to the exterior surface of the carrier 101. Each of the plurality of anchor points 141 forms a loop that allows the shoulder strap 112 to another to the bag 111. Each end of the shoulder strap 112 clips onto the plurality of anchor points 141.

The handle 113 is a grip used to carry and manipulate the carrier 101.

The footing 114 comprises a collection of pedestal structures that raise the carrier 101 above a supporting surface.

The pocket 115 is a second containment structure used to contain the control circuit 102. The interior of the pocket 115 is accessible from the exterior of the carrier 101.

The shoulder strap 112, the handle 113, the footing 114, and the pocket 115 are further defined elsewhere in this disclosure.

Figure 1:
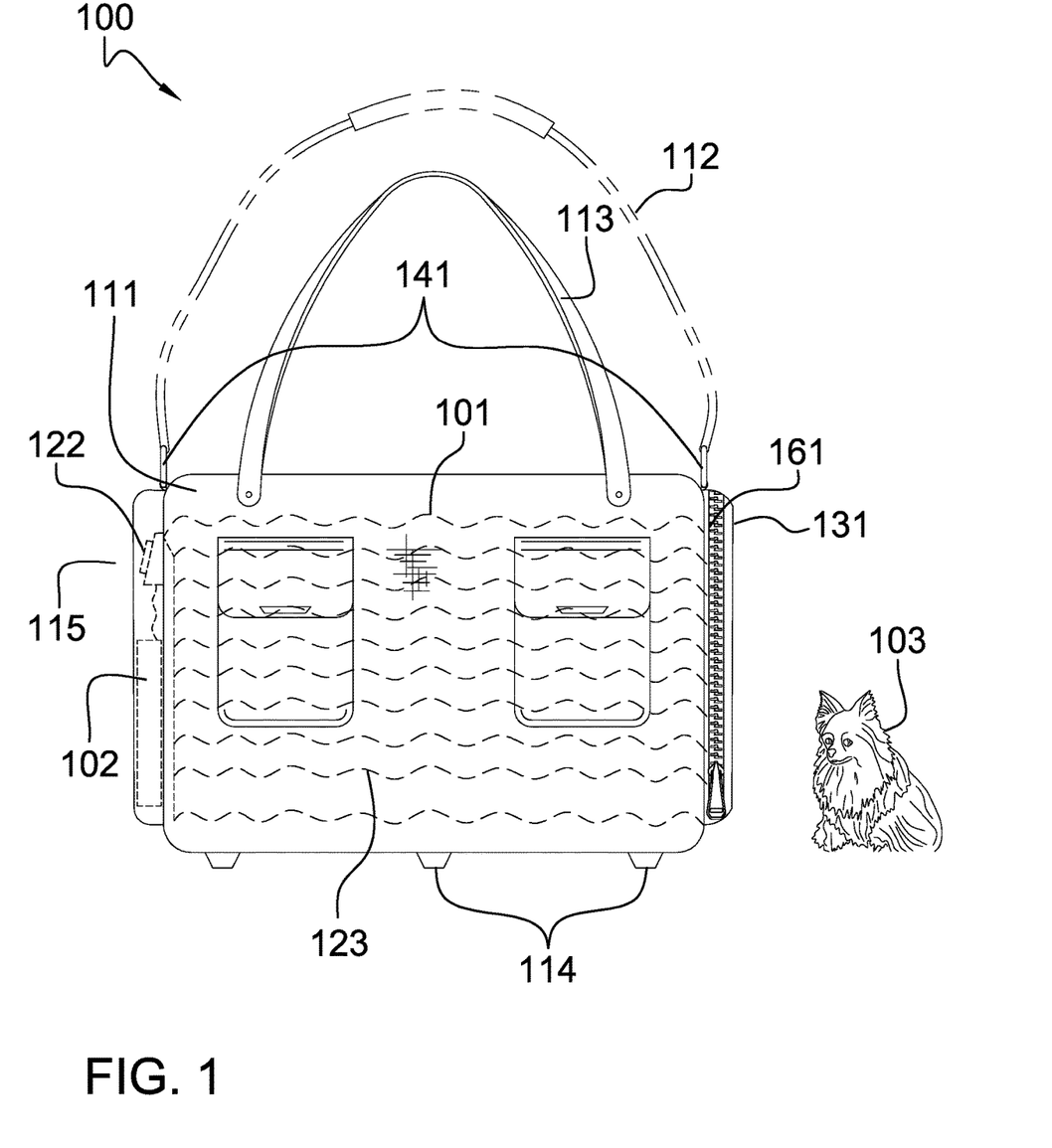
FIG. 1 is a front view of an embodiment of the disclosure.
Figure 2:
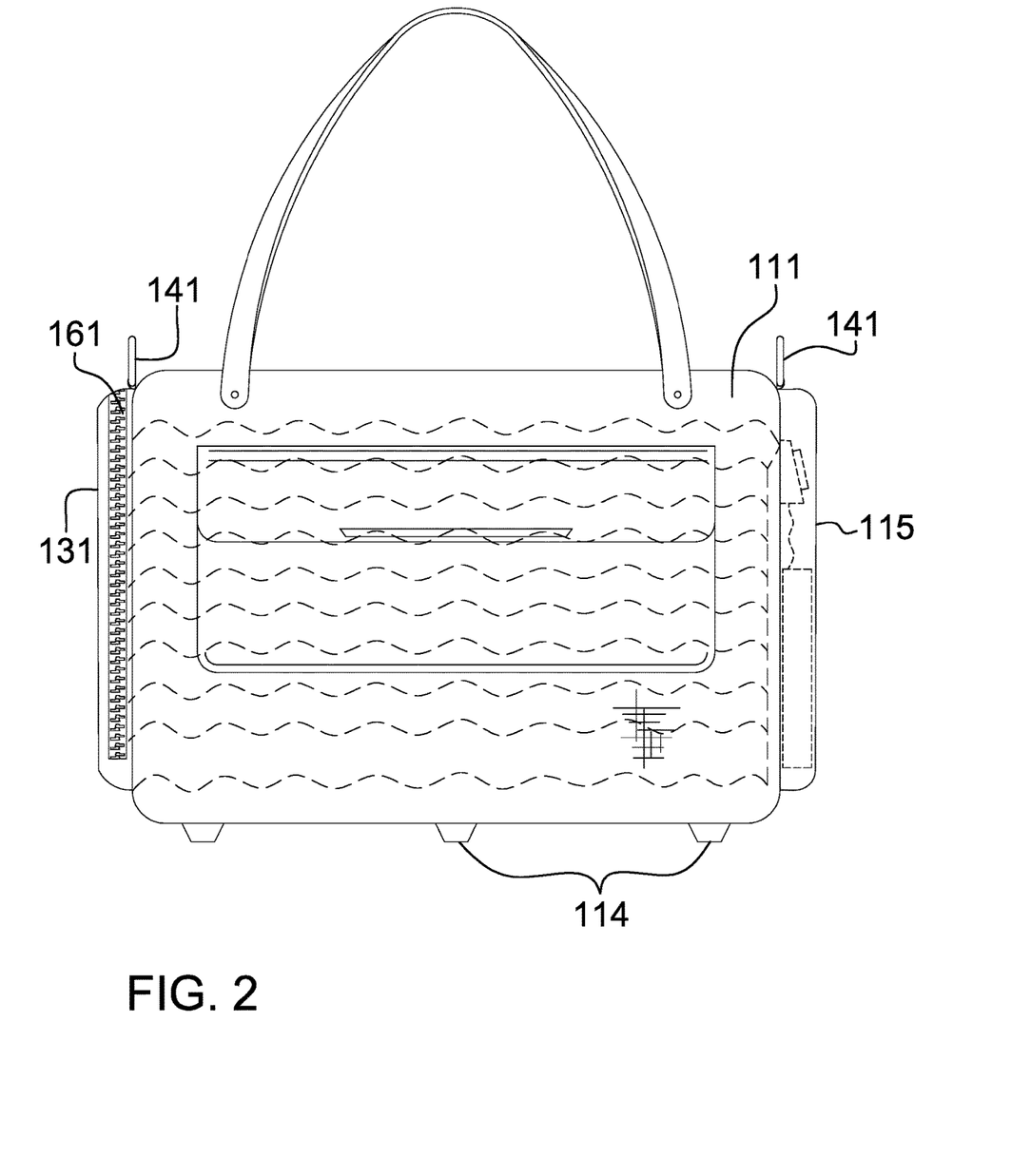
FIG. 2 is a rear view of an embodiment of the disclosure.
Figures 3, 4:
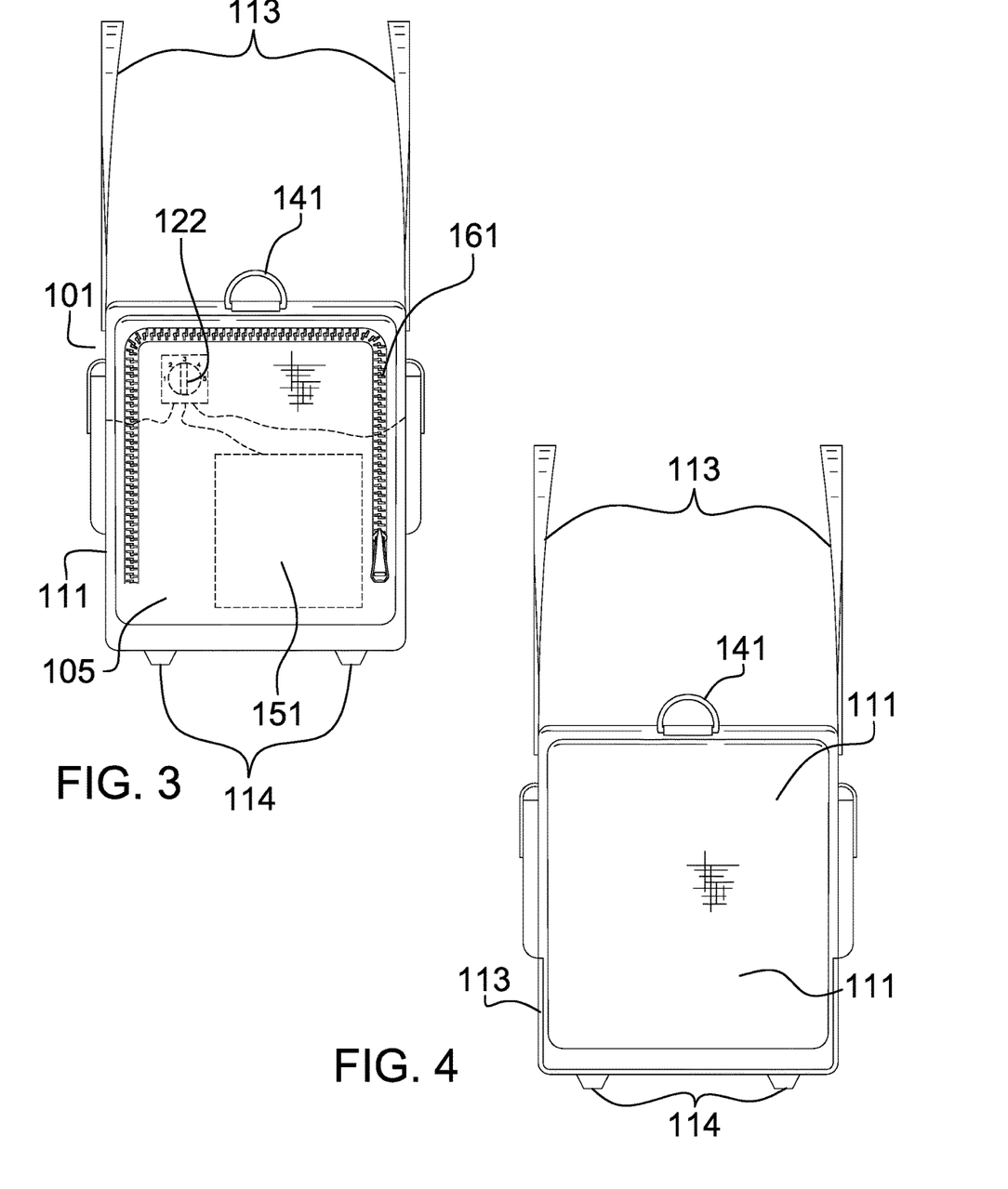
FIG. 3 is a side view of an embodiment of the disclosure.
FIG. 4 is a reverse side view of an embodiment of the disclosure.
Figure 5:
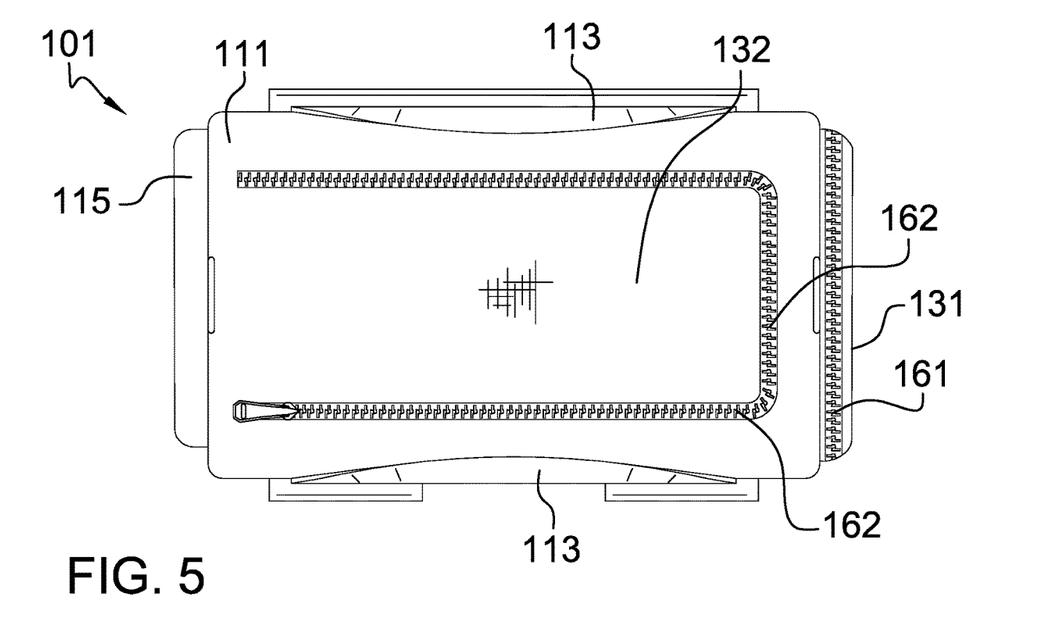
FIG. 5 is a top view of an embodiment of the disclosure.
Figure 6:
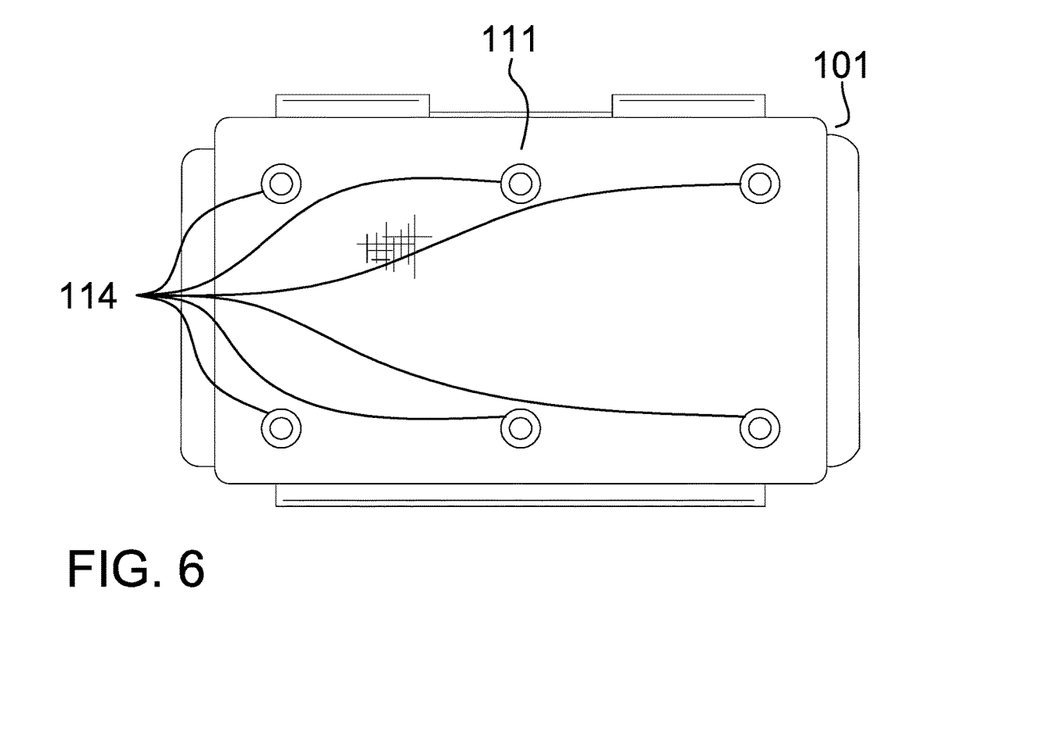
FIG. 6 is a top view of an embodiment of the disclosure.
Figure 7:
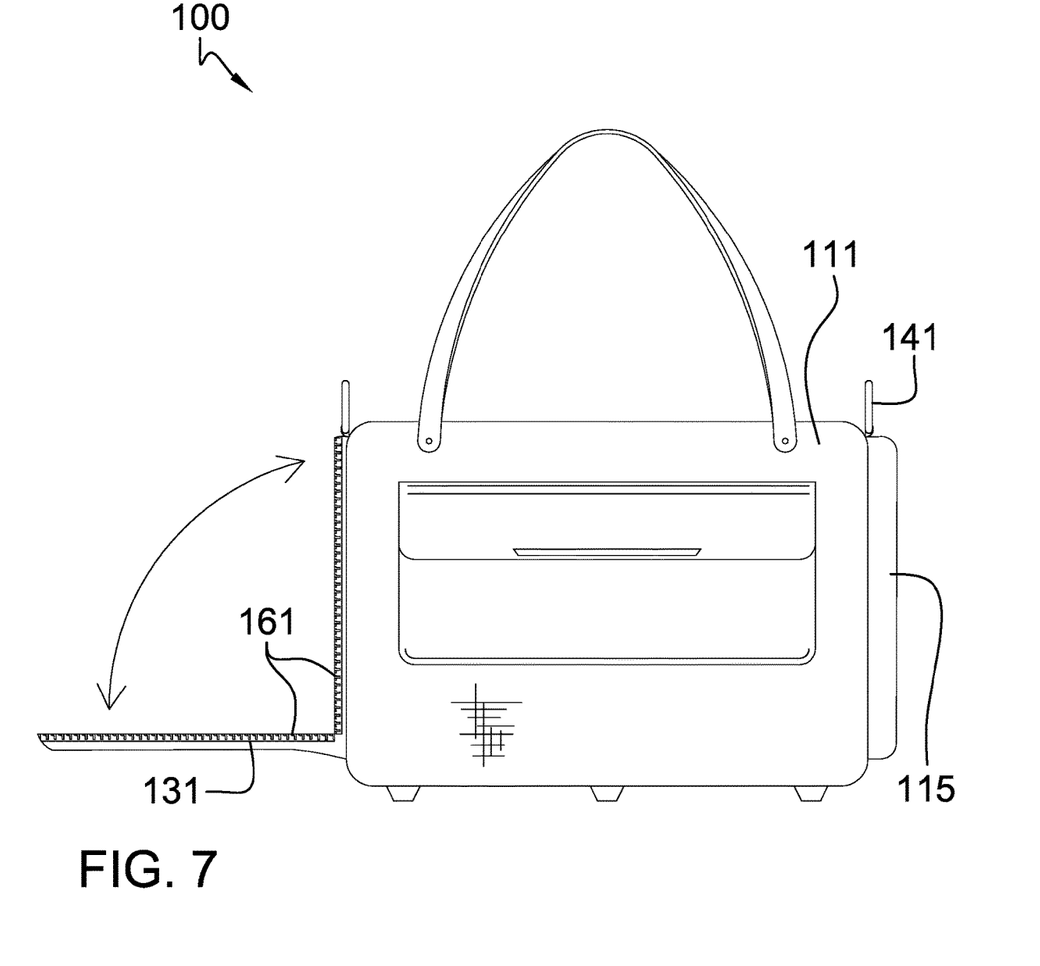
FIG. 7 is an in-use view of an embodiment of the disclosure.
Figure 8:
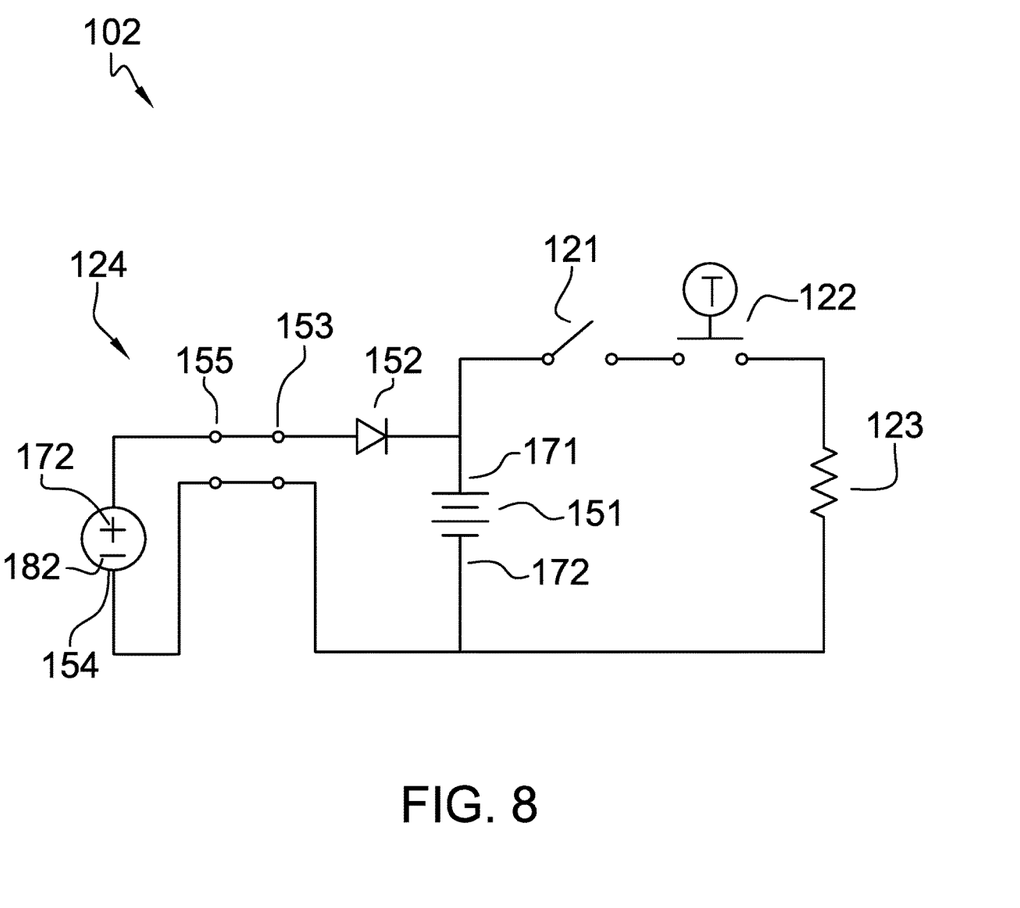
FIG. 8 is a schematic view of an embodiment of the disclosure.

The control circuit 102 is an electric circuit. The control circuit 102 warms the first containment space formed by the carrier 101. The control circuit 102 controls the temperature within the first containment space formed by the carrier 101. The control circuit 102 is an independently powered electric circuit. By independently powered is meant that the control circuit 102 can operate without an electrical connection to an external power source 154. The control circuit 102 comprises a master switch 121, a thermostat 122, a heating element 123, and a power circuit 124. The master switch 121, the thermostat 122, the heating element 123, and the power circuit 124 are electrically interconnected.

The master switch 121 is an electric switch. The master switch 121 is a maintained switch. The master switch 121 controls the flow of electric energy from the power circuit 124 into the thermostat 122. The master switch 121 enables the operation of the control circuit 102.

The thermostat 122 is an electric device. The thermostat 122 automatically actuates based on the temperature in the first containment space formed by the carrier 101. The thermostat 122 controls the flow of electric energy from the master switch 121 into the heating element 123. Specifically, the thermostat 122 actuates to a closed position when the temperature in the first containment space formed by the carrier 101 falls below a previously determined temperature. The thermostat 122 subsequently actuates to an open position when the temperature in the first containment space formed by the carrier 101 rises above the previously determined temperature. The thermostat 122 controls the temperature within the first containment space formed by the carrier 101. The thermostat 122 is defined elsewhere in this disclosure.

The heating element 123 is a resistive circuit element. The heating element 123 converts electrical energy provided through the power circuit 124 into heat. The heating element 123 warms the first containment space formed by the carrier 101. The heating element 123 is defined elsewhere in this disclosure.

The power circuit 124 is an electrical circuit. The power circuit 124 powers the operation of the control circuit 102. The power circuit 124 is an electrochemical device. The power circuit 124 converts chemical potential energy into the electrical energy required to power the control circuit 102. The power circuit 124 comprises a battery 151, a diode 152, a charging port 153, and an external power source 154. The external power source 154 further comprises a charging plug 155. The battery 151, the diode 152, the charging port 153, the external power source 154, and the charging plug 155 are electrically interconnected. The battery 151 is further defined with a first positive terminal 171 and a first negative terminal 181. The diode 152 is further defined with a second positive terminal 172 and a second negative terminal 182.

The battery 151 is an electrochemical device. The battery 151 converts chemical potential energy into the electrical energy used to power the control circuit 102. The battery 151 is a commercially available rechargeable battery 151. The chemical energy stored within the rechargeable battery 151 is renewed and restored through the use of the charging port 153. The charging port 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity.

The charging port 153 forms an electrical connection to an external power source 154 using a charging plug 155. The charging plug 155 forms a detachable electrical connection with the charging port 153. The charging port 153 receives electrical energy from the external power source 154 through the charging plug 155. The diode 152 is an electrical device that allows current to flow in only one direction. The diode 152 installs between the rechargeable battery 151 and the charging port 153 such that electricity will not flow from the first positive terminal 171 of the rechargeable battery 151 into the second positive terminal 172 of the external power source 154.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Battery: As used in this disclosure, a battery is a chemical device consisting of one or more cells, in which chemical energy is converted into electricity and used as a source of power. Batteries are commonly defined with a positive terminal and a negative terminal.

Befoulment: As used in this disclosure, befoulment refers to the excrement and other biological eliminations of a companion animal.

Clip: As used in this disclosure, a clip is a fastener that attaches to an object by gripping or clasping the object. A clip is typically spring loaded.

Companion Animal: As used in this disclosure, a companion animal is a domesticated animal that is maintained primarily for companionship. A companion animal is often referred to as a pet.

Control Circuit: As used in this disclosure, a control circuit is an electrical circuit that manages and regulates the behavior or operation of a device.

Copolymer: As used in this disclosure, a copolymer is a polymer formed from two or more repeating molecules (also referred to as monomers).

Cushion: As used in this disclosure a cushion is a structure formed with a pad that is used to prevent injury or damage to a person or object.

Diode: As used in this disclosure, a diode is a two terminal semiconductor device that allows current flow in only one direction. The two terminals are called the anode and the cathode. Electric current is allowed to pass from the anode to the cathode.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

External Power Source: As used in this disclosure, an external power source is a source of the energy that is externally provided to enable the operation of the present disclosure. Examples of external power sources include, but are not limited to, electrical power sources and compressed air sources.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Flap: As used in this disclosure, a flap is a sheeting or textile that is attached to a surface using one edge of the sheeting or textile such that the sheeting or textile rotates and hangs freely from the surface. The edge of the sheeting or textile that is distal from the secured edge is referred to as the free edge.

Fluid: As used in this disclosure, a fluid refers to a state of matter wherein the matter is capable of flow and takes the shape of a container it is placed within. The term fluid commonly refers to a liquid or a gas.

Footing: As used in this disclosure, a footing refers to one of a plurality of small pedestals that combine to: a) raise an object above a supporting surface; and, b) transfer the load path of the object to the supporting surface.

Grip: As used in this disclosure, a grip is an accommodation formed on or within an object that allows the object to be grasped or manipulated by a hand.

Hand Carried: As used in this disclosure, when referring to an item or device, hand carried means that the item or device is small and light enough to allow a person to transport the item or device while holding the item or device in their hands.

Handle: As used in this disclosure, a handle is an object by which a tool, object, or door is held or manipulated with the hand.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Inelastic Nature: As used in this disclosure, an inelastic nature refers to a flexible structure that maintains its new shape after the flexible structure has been deformed.

Liner: As used in this disclosure, a liner is a structure that is positioned between a first object and a second object such that the first object and the second object will not damage each other. A liner is said to line an object selected from the group consisting of the first object and the second object.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Luggage: As used in this disclosure, luggage is a trunk, bag, parcel, suitcase, or backpack in which domestic articles are contained during travel.

Maintained Switch: A used in this disclosure, a maintained switch is a switch that maintains the position that was set in the most recent switch actuation. A maintained switch works in an opposite manner to a momentary switch.

Monomer: As used in this disclosure, a monomer refers to a molecular structure that bonds to itself in a repeating manner to form a polymer.

Organic: As used in this disclosure, organic refers to a carbon-based chemical structure. A limited number of carbon-based salts are traditionally considered inorganic chemical structures and are excluded from the study of organic chemistry.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Pedestal: As used in this disclosure, a pedestal is an intermediary load bearing structure that that forms a load path between a supporting surface and an object, structure, or load.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Plug: As used in this disclosure, a plug is an electrical termination that electrically connects a first electrical circuit to a second electrical circuit or a source of electricity. As used in this disclosure, a plug will have two or three metal pins.

Pocket: As used in this disclosure, a pocket is a small pouch or storage space that is formed on or into an object. Pockets are often formed by joining a second textile or a second sheeting to a first textile or a first sheeting, respectively, by sewing or heat sealing respectively. Methods to form pockets are well-known and documented in the textile and apparel arts.

Polymer: As used in this disclosure, a polymer refers to a molecular chain that comprises multiple repeating units known as monomers. The repeating unit may be an atom or a molecular structure.

Port: As used in this disclosure, a port is an electrical termination that is used to connect a first electrical circuit to a second external electrical circuit. In this disclosure, the port is designed to receive a plug.

Relaxed Shape: As used in this disclosure, a structure is considered to be in its relaxed state when no shear, strain, or torsional forces are being applied to the structure.

Resistance: As used in this disclosure, resistance refers to the opposition provided by an electrical circuit (or circuit element) to the electrical current created by a DC voltage is presented across the electrical circuit (or circuit element). The term impedance is often used when referring to an AC voltage is presented across the electrical circuit (or circuit element).

Ring: As used in this disclosure, a ring is term that is used to describe a disk-like structure through which an aperture is formed. Rings are often considered loops.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sheeting: As used in this disclosure, a sheeting is a material, such as a paper, textile, a plastic, or a metal foil, in the form of a thin flexible layer or layers. The two surfaces of the sheeting with the greatest surface area are called the faces of the sheeting.

Shoulder Strap: As used in this disclosure, a shoulder strap is a strap used to suspend an object from a shoulder.

Strap: As used in this disclosure, a strap is a strip of leather, cloth, or other flexible material, often with a buckle, that is used to fasten, secure, carry, or hold onto something.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object. Include inferior superior and load path.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Textile: As used in this disclosure, a textile is a material that is woven, knitted, braided or felted. Synonyms in common usage for this definition include fabric and cloth. The two surfaces of the textile with the greatest surface area are called the faces of the textile.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. The thermostat is well-known and documented in the electrical arts.

Zipper: As used in this disclosure, a zipper is a fastening device comprising a first chain tape, a second chain tape, and a zipper pull. The first chain tape and the second chain tape are textile webbings formed with interlocking components that form a chain. The chain is opened and closed by pulling a slide, called a zipper pull, over the first chain tape, a second chain tape. The individual elements of the chain are called the teeth of the chain.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A heated pet carrier bag comprising
a carrier and a control circuit;
wherein the carrier contains the control circuit;
wherein the heated pet carrier bag is configured for use with a companion animal;
wherein the heated pet carrier bag is a luggage item;
wherein the heated pet carrier bag transports the companion animal;
wherein the heated pet carrier bag forms a temperature controlled space used to contain the companion animal;
wherein the control circuit comprises a master switch, a thermostat, a heating element, and a power circuit;
wherein the master switch, the thermostat, the heating element, and the power circuit are electrically interconnected;

wherein the power circuit comprises a battery, a diode, a charging port, and an external power source;

wherein the external power source further comprises a charging plug;

wherein the battery, the diode, the charging port, the external power source, and the charging plug are electrically interconnected;

wherein the battery is further defined with a first positive terminal and a first negative terminal;

wherein the diode is further defined with a second positive terminal and a second negative terminal.

2. The heated pet carrier bag according to claim 1
wherein the carrier forms the luggage used to transport the companion animal;
wherein the control circuit is an electric circuit used to warm the containment space for the companion animal.

3. The heated pet carrier bag according to claim 2
wherein the carrier is a luggage item;
wherein the carrier is a hand carried item;
wherein the carrier is a semi-rigid structure;
wherein the carrier forms a first containment space;
wherein the first containment space formed by the carrier is sized to receive and contain the companion animal for transport.

4. The heated pet carrier bag according to claim 3
wherein the control circuit is an electric circuit;
wherein the control circuit warms the first containment space formed by the carrier;
wherein the control circuit controls the temperature within the first containment space formed by the carrier.

5. The heated pet carrier bag according to claim 4
wherein the control circuit is an independently powered electric circuit;
wherein by independently powered is meant that the control circuit can operate without an electrical connection to an external power source.

6. The heated pet carrier bag according to claim 5
wherein the carrier comprises a bag, a shoulder strap, a handle, a footing, and a pocket;
wherein the shoulder strap, the handle, the footing and the pocket attach to the bag.

7. The heated pet carrier bag according to claim 6
wherein the power circuit is an electrical circuit;
wherein the power circuit powers the operation of the control circuit;
wherein the power circuit converts chemical potential energy into the electrical energy required to power the control circuit.

8. The heated pet carrier bag according to claim 7
wherein the bag is a container;
wherein the bag is a hollow semi-rigid structure;
wherein the bag forms the base of the luggage item used to transport the companion animal;
wherein the companion animal is transported in the hollow interior of the bag.

9. The heated pet carrier bag according to claim 8
wherein the bag further comprises a first entry flap, a second entry flap, and a liner;
wherein the first entry flap is a vertically oriented flap that provides access into the first containment space formed by the carrier;
wherein the first entry flap is formed through the exterior surface of the bag;
wherein the first entry flap further comprises a first zipper;
wherein the second entry flap is a horizontally oriented flap that provides access into the first containment space formed by the carrier;

wherein the second entry flap is formed through the exterior surface of the bag;
wherein the second entry flap further comprises a second zipper;
wherein the first zipper is a fastening structure;
wherein the first zipper secures the first entry flap to the exterior surface of the bag in a position that encloses the first containment space formed by the carrier;
wherein the second zipper is a fastening structure;
wherein the second zipper secures the second entry flap to the exterior surface of the bag in a position that encloses the first containment space formed by the carrier;
wherein the liner is a plastic sheeting;
wherein the liner lines a portion of the first containment space formed by the carrier such that the interior surfaces of the bag are protected.

10. The heated pet carrier bag according to claim 9
wherein the shoulder strap is a mechanical structure;
wherein the shoulder strap attaches to the bag;
wherein the shoulder strap is used to suspend the carrier from an object.

11. The heated pet carrier bag according to claim 10
wherein the shoulder strap further comprises a plurality of anchor points;
wherein each of the plurality of anchor points is a ring that attaches to the exterior surface of the carrier;
wherein each of the plurality of anchor points forms a loop that allows the shoulder strap to anchor to the bag;
wherein each end of the shoulder strap clips onto the plurality of anchor points.

12. The heated pet carrier bag according to claim 11
wherein the handle is a grip used to carry and manipulate the carrier;
wherein the footing comprises a collection of pedestal structures that raise the carrier above a supporting surface;
wherein the pocket is a second containment structure used to contain the control circuit;
wherein the interior of the pocket is accessible from the exterior of the carrier.

13. The heated pet carrier bag according to claim 12
wherein the master switch is an electric switch;
wherein the master switch is a maintained switch;
wherein the master switch controls the flow of electric energy from the power circuit into the thermostat;
wherein the master switch enables the operation of the control circuit.

14. The heated pet carrier bag according to claim 13
wherein the thermostat is an electric device;
wherein the thermostat automatically actuates based on the temperature in the first containment space formed by the carrier;
wherein the thermostat controls the flow of electric energy from the master switch into the heating element;
wherein the thermostat actuates to a closed position when the temperature in the first containment space formed by the carrier falls below a previously determined temperature;
wherein the thermostat actuates to an open position when the temperature in the first containment space formed by the carrier rises above the previously determined temperature;
wherein the thermostat controls the temperature within the first containment space formed by the carrier.

15. The heated pet carrier bag according to claim 14
wherein the heating element is a resistive circuit element;

wherein the heating element converts electrical energy provided through the power circuit into heat;

wherein the heating element warms the first containment space formed by the carrier.

16. The heated pet carrier bag according to claim 15 wherein the battery is a rechargeable battery;

wherein the charging port is an electrical circuit that reverses the polarity of the rechargeable battery;

wherein the charging port forms an electrical connection to the external power source using the charging plug.

17. The heated pet carrier bag according to claim 16 wherein the charging plug forms a detachable electrical connection with the charging port;

wherein the charging port receives electrical energy from the external power source through the charging plug.

18. The heated pet carrier bag according to claim 17 wherein the diode is an electrical device that allows current to flow in only one direction;

wherein the diode installs between the rechargeable battery and the charging port such that electricity will not flow from the first positive terminal of the rechargeable battery into the second positive terminal of the external power source.

\* \* \* \* \*